United States Patent [19]

Yoshii et al.

[11] Patent Number: 4,740,856

[45] Date of Patent: Apr. 26, 1988

[54] TAPE CASSETTE AND CASSETTE RECORDER USING THE SAME

[75] Inventors: Tetsuji Yoshii; Eiichi Hanakawa; Yuji Nakamura; Shuji Iwasaki; Teruyuki Takizawa, all of Osaka, Japan

[73] Assignee: Matsushita Electric Industrial Co., Ltd., Japan

[21] Appl. No.: 694,321

[22] Filed: Jan. 24, 1985

[30] Foreign Application Priority Data

Jan. 25, 1984 [JP] Japan .................................. 59-12339
Oct. 29, 1984 [JP] Japan ................................. 59-227154

[51] Int. Cl.⁴ ............................................. G11B 23/02
[52] U.S. Cl. .................................... 360/132; 360/96.5
[58] Field of Search ........................ 360/132, 96.5, 85; 242/199; 206/387; 220/334–335

[56] References Cited

U.S. PATENT DOCUMENTS 4,021,006  5/1977  Morimoto et al. .
4,422,599  12/1983 Okamura et al. .
4,643,304  2/1987  Sumida .......................... 360/132 X

FOREIGN PATENT DOCUMENTS 0078696  5/1983  European Pat. Off. .
3018311  1/1982  Fed. Rep. of Germany .
2020630  11/1979 United Kingdom .

Primary Examiner—A. J. Heinz
Attorney, Agent, or Firm—Lowe, Price, LeBlanc, Becker & Shur

[57] ABSTRACT

A tape cassette which can be recorded and played back on both sides or in opposite directions has a lid having a pair of side arms pivotally mounted on lateral sides of a cassette casing for opening and closing a front opening in the cassette casing. The lid is normally held in a closed position by means of springs which normally urge pivot pins on the side arms toward a rear side of the cassette casing. The tape cassette also has protective plates integrally projecting in a forward direction from the lateral sides of the cassette casing in covering relation to the side arms, respectively. The protective plate protects the side arms against intentional or accidental engagement with a finger or a cassette recorder, thereby preventing the lid from being easily opened. The cassette recorder for use with the tape cassette includes abutments for engaging distal ends of the protective plates for accurately positioning the tape casette as inserted in the cassette recorder.

14 Claims, 5 Drawing Sheets

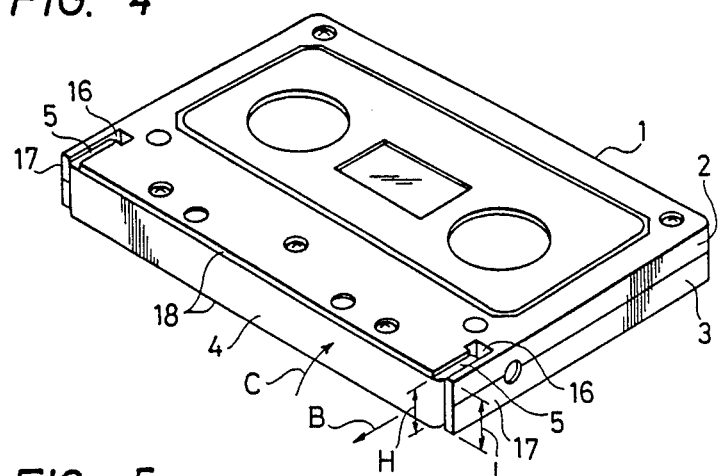
FIG. 4
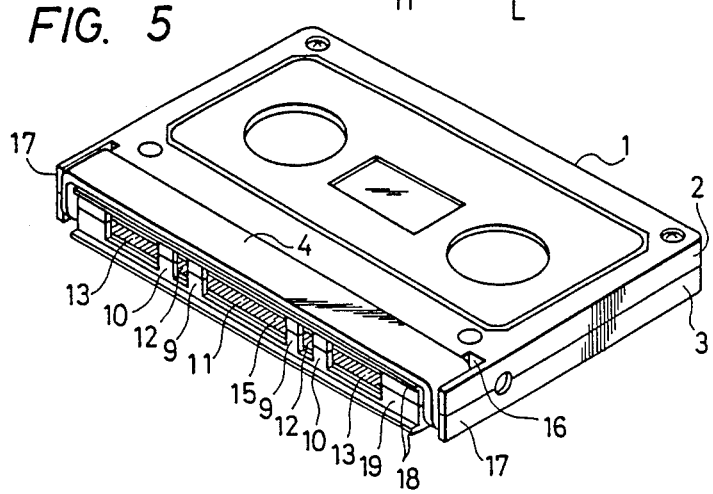
FIG. 5
FIG. 7
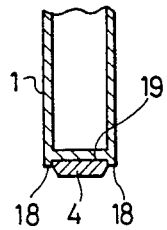
FIG. 6
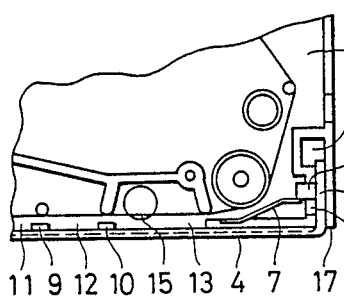
FIG. 8
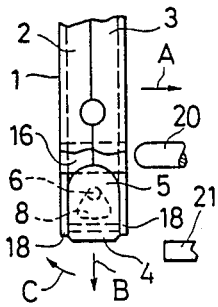

TAPE CASSETTE AND CASSETTE RECORDER USING THE SAME

BACKGROUND OF THE INVENTION

The present invention relates to a tape cassette having a pivotally movable lid or cover for a front opening defined in a tape cassette casing, and a cassette recorder using such a tape cassette.

There is known a tape cassette for use in video tape recorders, which has a pivotable lid for closing an opening in a cassette casing to prevent the tape surface from being smeared with fingerprints and/or dirt, and a locking device for locking the pivotable lid in a closed position. The known tape cassette has however been disadvantageous in that the lid can be intentionally opened or inadvertently or accidentally since a release member for the locking device is exposed on a side of a cassette half.

SUMMARY OF THE INVENTION

It is an object of the present invention to provide a tape cassette having a pivotally movable lid which will not be opened easily by an intentional attempt or an accidental or erroneous action to deal with the tape cassette.

Another object of the present invention is to provide a cassette recorder for use with such a tape cassette.

According to the present invention, a tape casette includes a cassette casing having a front side having at least one front opening, a rear side remote therefrom, and a pair of lateral sides. A lid having a pair of transverse side arms is pivotally mounted by pivot pins on the lateral sides, respectively, for pivotally moving the lid to open and close the front opening. The lateral sides have a pair of holes defined therein and substantially V-shaped guide walls tapered toward the rear side, the pivot pins being disposed respectively in the holes. The front side has means for engaging at least a portion of the lid, and means for resiliently urging the pivot pins toward the rear side. A pair of protective plates integrally project in a forward direction from the lateral sides, respectively, in a covering relation to the side arms, respectively.

According to the present invention, there is also provided a cassette recorder for recording and reproducing signals on and from a magnetic tape, on both sides or in opposite directions, contained in a tape cassette having a cassette casing having a front opening, a lid pivotally movably mounted on the cassette casing for opening and closing the front opening, the lid having a pair of side arms pivotally attached to the cassette casing, and a pair of protective plates extending from the cassette casing for protecting the side arms. The cassette recorder comprises a chassis assembly having therein abutments for engaging distal ends of the protective plate with the opening closed by the lid for positioning the tape cassette inserted in the chassis assembly. The cassette recorder also includes a cassette shifting means, such as a cassette holder, movably disposed in the chassis assembly for shifting the tape cassette between at least a first position in which the tape cassette is inserted in and ejected from the cassette shifting means and a second position in which the tape cassette is played back, the cassette shifting means having the abutments.

BRIEF DESCRIPTION OF THE DRAWINGS

The present invention will be described in detail by way of illustrative example with reference to the accompanying drawings, in which;

FIG. 4 is a perspective view of a tape cassette according to an embodiment of the present invention;

FIG. 5 is a perspective view of the tape cassette shown in FIG. 4 with a lid opened;

FIG. 6 is a fragmentary plan view illustrative of the interior of the tape cassette of FIG. 4;

FIG. 7 is a fragmentary cross-sectional view showing the manner in which the lid is locked;

FIG. 8 is a fragmentary side elevational view, partly broken away, of the tape cassette of FIG. 4 as it is loaded into a cassette recorder, the view also showing portions of an automatic opening mechanism in the cassette recorder;

DETAILED DESCRIPTION

Figure 1:
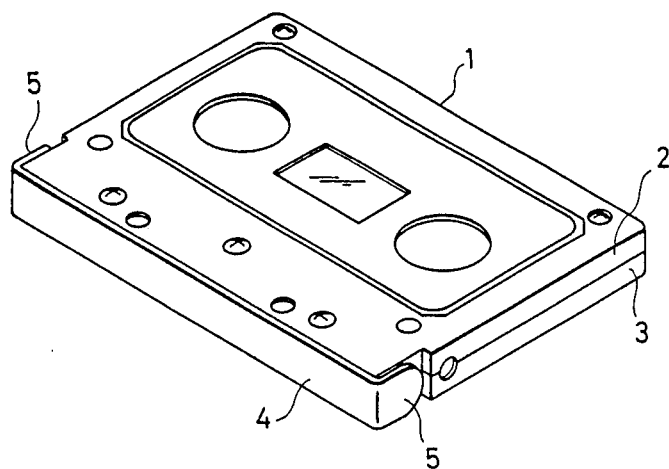
FIG. 1 is a perspective view of a tape cassette with a lid.

Like or corresponding parts are denoted by like or corresponding reference characters throughout the views.

FIG. 1 shows a tape cassette, such as a video tape cassette, disclosed in U.S. patent application Ser. No. 646,212 (EPC Patent Application Ser. No. 84306100.3), the disclosed tape cassette being proposed by an inventor of the present invention.

Figure 2:
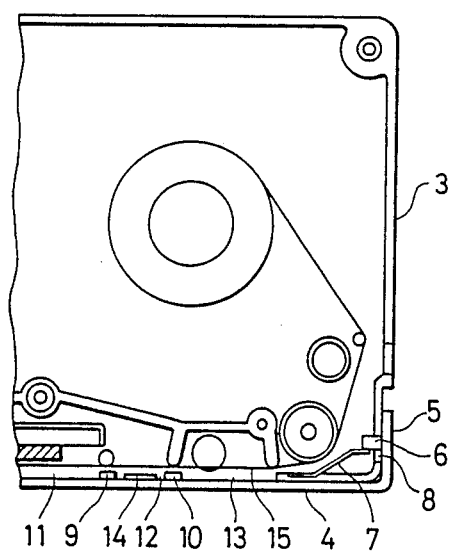
FIG. 2 is a fragmentary plan view showing the interior of the tape cassette illustrated in FIG. 1.
Figure 3:
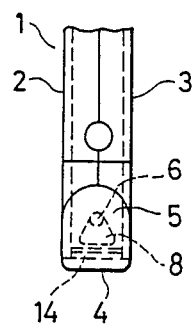
FIG. 3 is a fragmentary side elevational view of the tape cassette as assembled.

The tape cassette shown in FIG. 1 is composed of a cassette body or casing 1 comprising an upper cassette half 2, a lower cassette half 3 attached to the upper cassette half 2, and a lid or cover 4 pivotably mounted on the cassette casing 1 by a pair of side arms 5 on opposite ends of the lid 4. As illustrated in FIGS. 2 and 3, each of the side arms 5 has a pivot pin 6 projecting laterally therefrom and normally urged backwards by means of a leaf spring 7 disposed in the cassette casing 1. The pivot pin 6 extends through a hole 8 defined in a side wall of the cassette casing 1, the hole 8 having a substantially triangular or V shape (FIG. 3) tapered in a rearward direction of the tape cassette. The triangular hole 8 serves to guide and position the pivot pin 6 as it is turned when the lid 4 is opened and closed. The cassette casing 1 has openings 11, 12, 13 defined in a front side thereof by spaced partition bars 9, 10. The lid 4 has a projection 14 on an inner surface thereof, which can be fitted in the opening 12 or a recess defined in the front side of the cassette casing 1, for locking the lid 4 in the closed position. The tape cassette also includes a magnetic tape 15 wound around supply and takeup reels therein and extending through a prescribed path therein.

In use, the lid 4 can be angularly moved vertically (FIG. 1) to allow the tape to be played back on both tape sides or in opposite directions. The lid 4 can easily be unlocked and opened by turning the side arms 5 with a finger or a portion of a cassette recorder.

FIG. 4 shows a tape cassette according to an embodiment of the present invention, the tape cassette being shown as closed. The cassette casing 1 has cassette positioning holes or reference holes 16 for the insertion therethrough of members for positioning the tape cassette which is loaded in a playback position in a cassette recorder. The side arms 5 of the lid 4 have rear end portions projecting respectively into the reference holes 16. According to the present invention, the cassette casing 1 includes a pair of horizontally spaced protective plates 17 extending from the lateral sides of the casing 1 in covering relation to the side arms 5, respectively. The protective plates 17 have a height L substantially equal to or greater than the height H of the lid 4. FIG. 5 shows the tape cassette in perspective with the lid 4 opened. The cassette casing 1 has a pair of vertically spaced ridges 18 extending along upper and lower edges of the front side of the casing 1 and defining a recess 19 therebetween. The lid 4 as it is in the closed position is fitted in the recess 19 between the ridges 18 to guard against pivotal movement of the lid 4, as illustrated in FIGS. 6 and 7.

Operation of the tape cassette shown in FIGS. 4 through 7 will now be described.

For opening the lid 4 from the closed position of FIG. 4, the lid 4 is required to be unlocked out of fitting engagement with the ridges 18 on the front side of the tape cassette 1. The side arms 5 however cannot easily be pulled out with a finger since they are covered with the protective plates 17. Therefore, the lid 4 cannot be opened from the closed position by intentional or inadvertent action. The lid 4 can be opened when inserted into a cassette recorder, as described below. As long as the tape cassette is out of the cassette recorder, therefore, the magnetic tape 15 is protected from being smeared with finger prints or pulled out and damaged by an intentional attempt.

As shown in FIG. 8, the cassette recorder has a cassette positioning pin 20 disposed for registry with one of the cassette positioning holes 16 when the tape cassette is loaded in the cassette recorder, and a lid opening pin 21 disposed for engagement with one of the side arms 5 of the lid 4 when the tape cassette is loaded in the cassette recorder. After the tape cassette has been placed in the cassette recorder, the tape cassette is moved in the direction of the arrow A normal to the plane of the tape cassette to insert the cassette positioning pin 20 into the cassette positioning hole 16 and also to cause the lid opening pin 21 to engage a proximal or lower end (FIG. 8) of the side arm 5. As the tape cassette is continuously displaced in the direction of the arrow A, the lid opening pin 21 pushes the lower end of the side arm 5 to turn the lid 4 about the pin 6 clockwise in the direction of the arrow C. After the lid 4 has turned for more than 45°, it starts being angularly moved automatically of its own accord under the force of the spring 7, until the lid 4 reaches a 90°-spaced opened position in which the lid 4 is held against an upper surface of the cassette casing 1. The above cassette loading operation or lid opening operation remains the same when the magnetic tape is to be played back on both tape sides or in the opposite directions. For closing the opened lid 4 from the position of FIG. 5, a rear edge of the lid 4 should be pushed in a forward direction. After the lid 4 has turned through 45°, it is forced by the spring 7 to return automatically to the closed position of FIG. 4.

Figure 9:
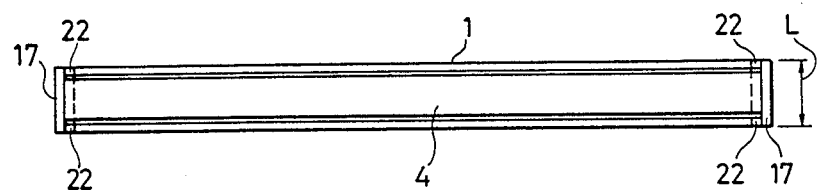
FIG. 9 is a front elevational view of a tape cassette according to another embodiment of the present invention.

FIG. 9 shows another ebodiment in which a lid 4 including side arms 5 has a height smaller than the entire thickness of the cassette casing, with recesses 22 defined adjacent the protective plates 17. The recesses 22 can be utilized so that they can be detected by a suitable detector disposed in a cassette recorder to determine the orientation of the tape cassette as it is loaded or prevent the tape cassette from being inserted in a reverse direction. Tip or distal ends of the protective plates 17 may be employed to position the tape cassette in a cassette shifting means such as a cassette holder in the cassette recorder.

Figure 10:
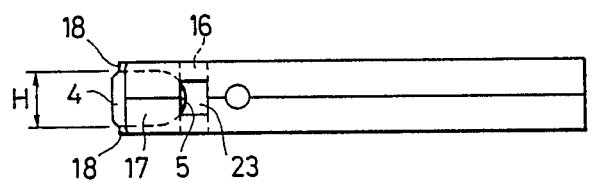
FIG. 10 is a side elevational view of a tape cassette having an opening for unlocking a lid, according to still another embodiment of the present invention.

FIG. 10 shows a tape cassette according to still another embodiment of the invention. A protective plate 17 has a recess 23 defined therein extending toward a rear end of the side arm 5. The recess 23 allows the lid 4 to be unlocked by the side arm 5 accessed through the recess 23.

Figure 11:
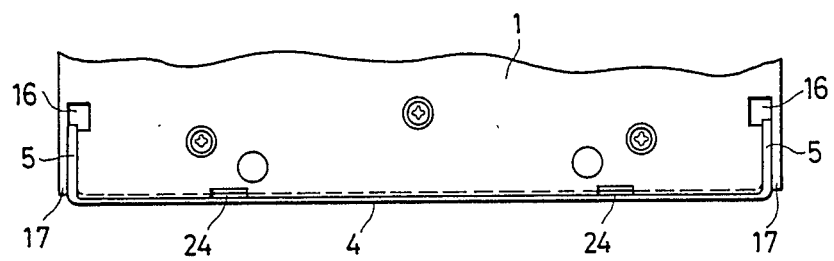
FIG. 11 is a fragmentary plan view of a tape cassette according to a still further embodiment of the present invention.

FIG. 11 is illustrative of a still further embodiment in which a plurality of recesses 24 are defined in upper and lower edges of a front side of the cassette casing. The lid opening pins 21 (FIG. 8) can be located close to the cassette casing 1 respectively at the recesses 24 for reliably engaging and lifting the lower edge of the lid 4.

Figures 12, 13:
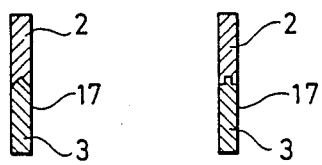
FIG. 12 is a cross-sectional view of a protective plate composed of extensions of upper and lower cassette halves.
FIG. 13 is a cross-sectional view of a protective plate according to a modification of the present invention.

As shown in FIG. 12, a protective plate 17 is composed of portions of the upper and lower casing halves 2, 3 coupled together by a mortise-and-tenon joint so that the assembled protective plate 17 is reinforced. The mortise-and-tenon joint employed has a mortise of a triangular cross section and a tenon of a complementary triangular cross section fitted in the mortise.

FIG. 13 shows a protective plate 17 composed of upper and lower casing half portions 2, 3 joined to each other by a mortise-and-tenon joint comprising a mortise of a rectangular cross section and a tenon of a complementary cross-section fitted therein.

With this arrangement, the cassette casing can be assembled in the same manner as conventional cassette casings, and the protective plate 17 is reinforced against positional displacements and sluggish pivotal movement of the lid due to deformations or other difficulties.

Although the protective plate has been shown as comprising upper and lower casing halves, the protective plate may be composed of one of the upper and lower casing halves. The protective plate may be of a width smaller than the thickness of the tape cassette casing, and may have a round or tapered distal end which may be utilized to detect the orientation of the tape cassette as loaded into the cassette recorder or prevent the tape cassette from being loaded in a reverse direction.

Figure 14:
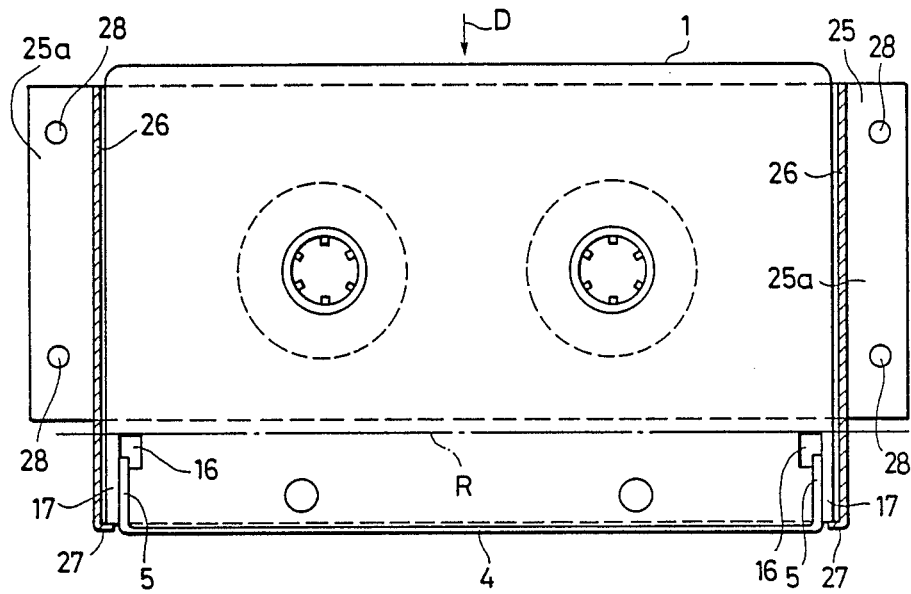
FIG. 14 is a plan view, partly in cross section, of a cassette recorder according to the present invention, the view also showing a tape cassette positioned in a cassette holder in the cassette recorder.

FIG. 14 shows a cassette holder 25 in a cassette recorder. The cassette holder 25 has a pair of side walls 26 including respective extensions having inturned lips or abutments 27 on distal ends thereof. The cassette holder 25 also includes a pair of flanges 25a having guide holes 28 through which extend guide shafts for guiding the cassette holder 25 in its vertical movement. A reference line R passes through rear edges of the cassette positioning holes 16 in the tap cassette. The cassette holder 25 serves to limit the position or interval in which the tap cassette is inserted when the distal ends of the protective plate 17 of the tape cassette are held against the abutments 27.

Figure 15:
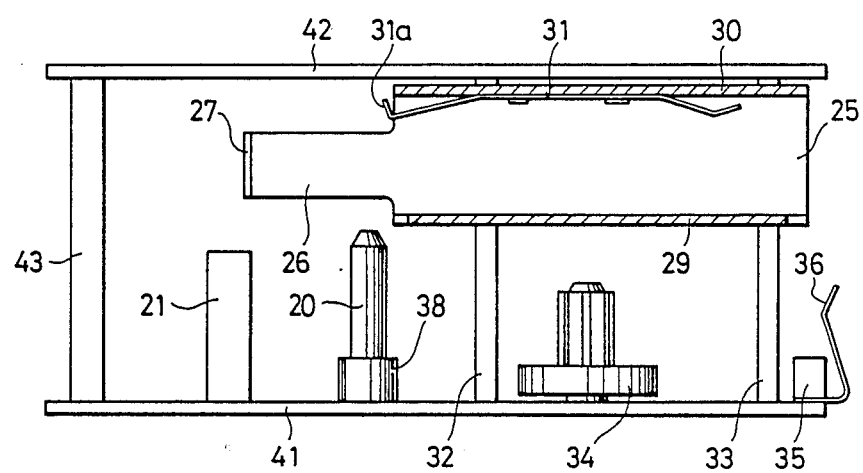
FIG. 15 is a side elevational view showing parts of the cassette recorder.

In FIG. 15, the cassette holder 25 is in a first position in which the tape cassette can be inserted or removed. The cassette holder 25 has a lower panel 29, an upper panel 30, and a spring 31 attached to an inner surface of the upper panel 30 for resiliently depressing the upper surface of the inserted tape cassette to hold the latter in the cassette holder 25. The cassette holder 25 is guided in its vertical movement by the guide shafts, designated 32, 33, passing through the guide holes 28 (FIG. 14). A hub driver 34 is disposed on a lower chassis 41 of the cassette recorder for engaging a tape hub (not shown) in the tape cassette for supplying and winding a magnetic tape in the tape cassette. A pin 35 is mounted on the lower chassis 41 for limiting, with its upper surface, the height of a rear edge of the tape cassette when the latter is in a playback position in the cassette recorder. The tape cassette as it is in the playback position is urged by a spring 36 fastened together with the pin 35 to the lower chassis 41 and held resiliently against the rear edge of the tape cassette. The cassette positioning pin 20 is also mounted on the lower chassis 41 and has a lower step or shoulder. The cassette positioning pin 20 is inserted in the cassette positioning hole 16 in the tape cassette as it is in the playback position for limiting longitudinal and transverse positions of the tape cassette in the playback position. The step 38 serves to limit the height of the front side of the tape cassette and also to release or unlock the lid 4 in the closed position. The lid opening or releasing pin 21 is disposed on the lower chassis 41 for raising the lower edge of the lid 4 to open the lid 4 as the tape cassette is lowered by the cassette holder 25. The lower chassis 41 is coupled to an upper chassis 42 in vertically spaced relation by means of posts 43, only one shown.

Figure 16:
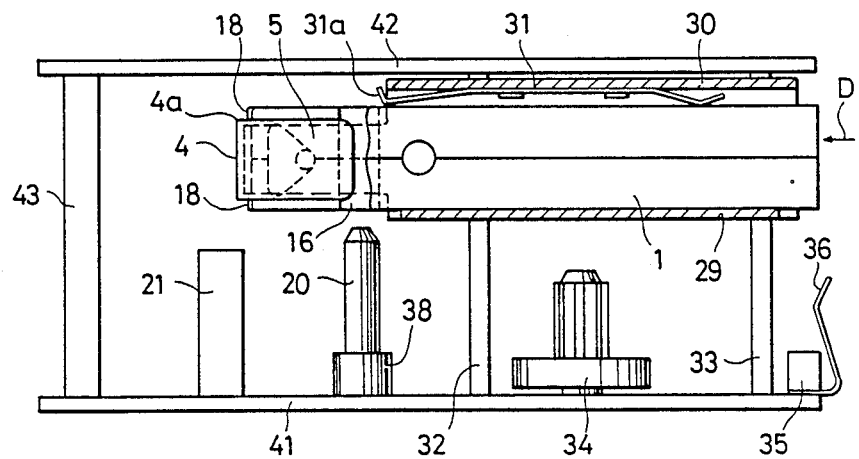
FIG. 16 is a view similar to FIG. 15, showing the tape cassette inserted in the cassette holder.
Figure 17:
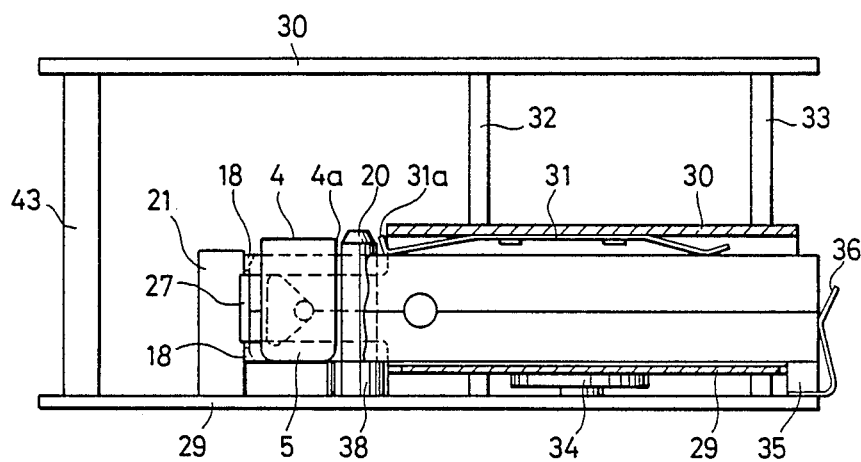
FIG. 17 is a side elevational view illustrative of the tape cassette placed in a playback position in the cassette recorder.

FIG. 16 shows the cassette holder 25 with the tape cassette 1 just inserted therein in the direction of the arrow D. In FIG. 17, the tape cassette holder 25 inserted in the cassette holder 25 is lowered thereby into the playback position or a second position, in which the lid 4 is opened.

When the cassette holder 25 with the tape cassette 1 therein is lowered from the position of FIG. 16, the cassette positioning pin 20 is inserted into the cassette positioning pin 16, pushes the rear end of the side arm 5 to displace the lid 4 forward away from the front side of the tape cassette 1. Upon continued downward movement of the cassette holder 25, the lower edge of the lid 4 is brought against the upper end of the lid opening pin 21 which lifts and turns the lid 4 to the open position. When the tape cassette 1 has been fully lowered, the tape cassette 1 is limited in height by the pin 35, the step 38, and the spring 31, and resiliently urged in a forward direction under the resilient force of the spring 36 so as to be properly positioned in a back-and-forth direction by the cassette positioning pin 20. The tape cassette 1 is also positioned in a lateral direction by the positioning pin 20 fitted in the positioning hole 16.

When the tape cassette 1 is to be removed, the cassette holder 25 is raised from the playback or second position (FIG. 17) to the eject or first position (FIG. 15), in which the tape cassette 1 is ejected. While the tape cassette 1 is being ejected out of the cassette holder 25, the upper edge (denoted 4a in FIG. 17) of the lid 4 as it is in the open position is engaged by a front end 31a of the spring 31 and automatically closed. Thus, the tape cassette 1 can be removed with the lid 4 in the closed position.

With the cassette recorder shown in FIGS. 14 through 17, the tape cassette 1 as it is inserted can be positioned by the abutments 27 held against the front ends of the protective plates 17. When the tape cassette 1 is lowered, it is positioned by the positioning pins 20 on the lower chassis 41 and the lid 4 is released in the closed position by the steps 38 of the positioning pins 20. At the same time, the lid 4 is automatically opened by the lid opening pins 21. Upon removal of the tape cassette 1, the lid 4 can automatically be closed by the spring 31.

The cassette shifting means is not limited to the illustrated cassette holder, but may comprise a cam lever or the like for directly moving a tape cassette, a manually operated mechanism for loading a tape cassette, or a angularly movable cassette holder.

Although certain preferred embodiments of the present invention have been shown and described in detail, it should be understood that various changes and modifications may be made therein without departing from the scope of the appended claims.

What is claimed is:

1. A tape cassette comprising:
   (a) a cassette casing having a front side having at least one front opening, a rear side remote therefrom and a pair of lateral sides;
   (b) a lid having a pair of transverse side arms pivotally mounted by pivot pins on said lateral sides, respectively, for pivotally moving said lid to open and close said front opening, said lateral sides having a pair of substantially triangular through holes defined respectively therein and having substantially V-shaped respective guide walls tapered toward said rear side, said pivot pins being disposed respectively in said holes and positioned by said guide walls, said front side having integral means for lockingly engaging at least a portion of said lid to hold said lid in a position to close said front opening;
   (c) means acting on said pivot pins for resiliently urging said pivot pins toward said rear side; and
   (d) a pair of protective plates integrally formed with said lateral sides and projecting in a forward direction from said lateral sides, respectively, in a substantially fully covering relation to said side arms, respectively.

2. A tape cassette according to claim 1, wherein said casing has a pair of cassette positioning holes, said side arms having rear ends disposed in said cassette positioning holes, respectively.

3. A tape cassette according to claim 1, wherein said protective plates have holes defined therein and extending toward rear ends of said side arms, respectively.

4. A tape cassette according to claim 1, wherein said side arms have a height smaller than the entire thickness of said cassette casing.

5. A tape cassette according to claim 1, wherein said cassette casing comprises a pair of upper and lower casing halves, said protective plates being composed of members of said upper and lower casing halves, said members having portions engaging with each other.

6. The tape cassette of claim 5, wherein there is formed a mortise-and-tenon joint between the protective plates and their associate upper and lower casing half portions.

7. The tape cassette of claim 6, wherein said joint is of rectangular cross-section.

8. The tape cassette of claim 6, wherein said joint is of triangular cross-section.

9. The tape cassette of claim 1, wherein said integral means for lockingly engaging includes a pair of upper and lower ridges extending the length of the front opening defining a recess adapted to receive the lid in the closed position with the ridges maintaining the lid in said closed position in cooperation with the bias of the resiliently urging means.

10. The tape cassette according to claim 1, wherein there is only one substantially triangular through hole in each said lateral side receiving only one pivot pin in the associated through hole.

11. A cassette recorder for recording and reproducing signals on and from a magnetic tape, on both sides or in opposite directions, contained in a tape cassette having a cassette casing having a front opening, a lid pivotally movably mounted on the cassette casing for opening and closing the front opening, the lid having a pair of side arms pivotally attached to the cassette casing, and a pair of protective plates extending from the cassette casing for protecting the side arms, said cassette recorder comprising a chassis assembly having therein abutments for engaging distal ends of said protective plates with said opening closed by said lid for positioning the tape cassette inserted in said chassis assembly.

12. A cassette recorder according to claim 11, including cassette shifting means movably disposed in said chassis assembly for shifting the tape cassette between at least a first position in which the tape cassette is inserted in and ejected from the cassette shifting means and a second position in which the tape cassette is played back, said cassette shifting means having said abutments.

13. A cassette recorder according to claim 12, including at least one cassette positioning member mounted in said chassis assembly and insertable into at least one cassette positioning hole in said cassette casing for positioning said tape cassette and unlocking said lid from a closed position said front opening when said tape cassette is shifted to said second position.

14. A cassette recorder for recording and reproducing signals on and from a magnetic tape, on both sides or in opposite directions, contained in a tape cassette having a cassette having a front opening, a lid pivotally movably mounted on the cassette casing for opening and closing the front opening, the lid having a pair of side arms pivotally attached to the cassette casing, and a pair of protective plates extending from the cassette casing for protecting the side arms, said cassette recorder comprising a chassis assembly having therein abutments for engaging distal ends of said protective plate with said opening closed by said lid for positioning the tape cassette inserted in said chassis assembly, wherein said cassette shifting means includes a spring for holding the tape cassette in said cassette shifting means, said spring being positioned for engagement with said lid to cause the same to close said front opening automatically when said tape cassette is ejected from said cassette shifting means.

* * * * *